US012138780B2

(12) United States Patent
White

(10) Patent No.: US 12,138,780 B2
(45) Date of Patent: Nov. 12, 2024

(54) VESSEL GRIPPER

(71) Applicant: Azenta US, Inc., Burlington, MA (US)

(72) Inventor: Stephen White, Chester (GB)

(73) Assignee: Azenta US, Inc., Burlington, MA (US)

( * ) Notice: Subject to any disclaimer, the term of this patent is extended or adjusted under 35 U.S.C. 154(b) by 943 days.

(21) Appl. No.: 17/153,835

(22) Filed: Jan. 20, 2021

(65) Prior Publication Data
US 2021/0221007 A1 Jul. 22, 2021

(30) Foreign Application Priority Data

Jan. 20, 2020 (GB) ..................................... 2000798

(51) Int. Cl.
| B25J 15/00 | (2006.01) |
| B25J 13/08 | (2006.01) |
| B65G 1/04 | (2006.01) |
| B65G 1/137 | (2006.01) |
| B65G 47/90 | (2006.01) |
| B25J 15/10 | (2006.01) |

(52) U.S. Cl.
CPC ......... B25J 15/0038 (2013.01); B25J 13/082 (2013.01); B65G 1/0464 (2013.01); B65G 1/137 (2013.01); *B25J 15/103* (2013.01)

(58) Field of Classification Search
CPC ............... B25J 15/0033; B25J 15/0038; B25J 15/0226; B25J 15/028; B25J 15/103; B25J 15/106; B25J 13/082; B65G 47/901; B65G 47/902; B65G 1/0464; G01N 35/0099; B23B 31/1261
USPC ................................................. 294/113, 116
See application file for complete search history.

(56) References Cited

U.S. PATENT DOCUMENTS 2,890,888 A * 6/1959 Damijonaitis ...... B23B 31/1261
279/137
4,173,324 A * 11/1979 Rudmann ................ B64G 4/00
901/31

(Continued)

FOREIGN PATENT DOCUMENTS

| GB | 1407384 A | * | 9/1975 | ......... B23B 31/1261 |
| WO | 2021/150643 A1 | | 7/2021 | |

OTHER PUBLICATIONS

International Search Report and Written Opinion for International Application No. PCT/US2021/014243, titled: "Vessel Gripper," Date Mailed: May 18, 2021.

*Primary Examiner* — Dean J Kramer
(74) *Attorney, Agent, or Firm* — Hamilton, Brook, Smith & Reynolds, P.C.

(57) ABSTRACT

A gripper provides for gripping labware having a variety of diameters and shapes. The gripper includes a support structure having a center axis, a motor, and a gripper stage. The gripper stage includes a plurality of blades, each of the blades having a first end through which a blade rotation axis extends, a second end that is circumferentially and radially moveable to rotate the blade about the blade rotation axis, and c) a center portion. A ring structure is coupled to the motor to rotate the ring structure around the center axis. The ring structure, as it rotates, moves the second end of each blade to rotate the blade about the blade rotation axis of the blade to shift the center portion towards the center axis to contact an outer portion of a vessel extending along the center axis.

21 Claims, 17 Drawing Sheets

(56) References Cited

U.S. PATENT DOCUMENTS

| | | | | |
|---|---|---|---|---|
| 4,579,380 | A | * | 4/1986 | Zaremsky .............. B25J 19/021 |
| | | | | 901/33 |
| 10,086,518 | B1 | | 10/2018 | Fromm et al. |
| 10,209,267 | B1 | * | 2/2019 | Kowalchuk ............ G01N 21/27 |
| 10,427,221 | B1 | * | 10/2019 | Bermudez ........... B23B 31/1292 |
| 2010/0015007 | A1 | * | 1/2010 | Pedrazzini ............. G01N 35/04 |
| | | | | 422/64 |
| 2018/0281204 | A1 | | 10/2018 | Fromm et al. |
| 2019/0293344 | A1 | | 9/2019 | Sun et al. |

* cited by examiner

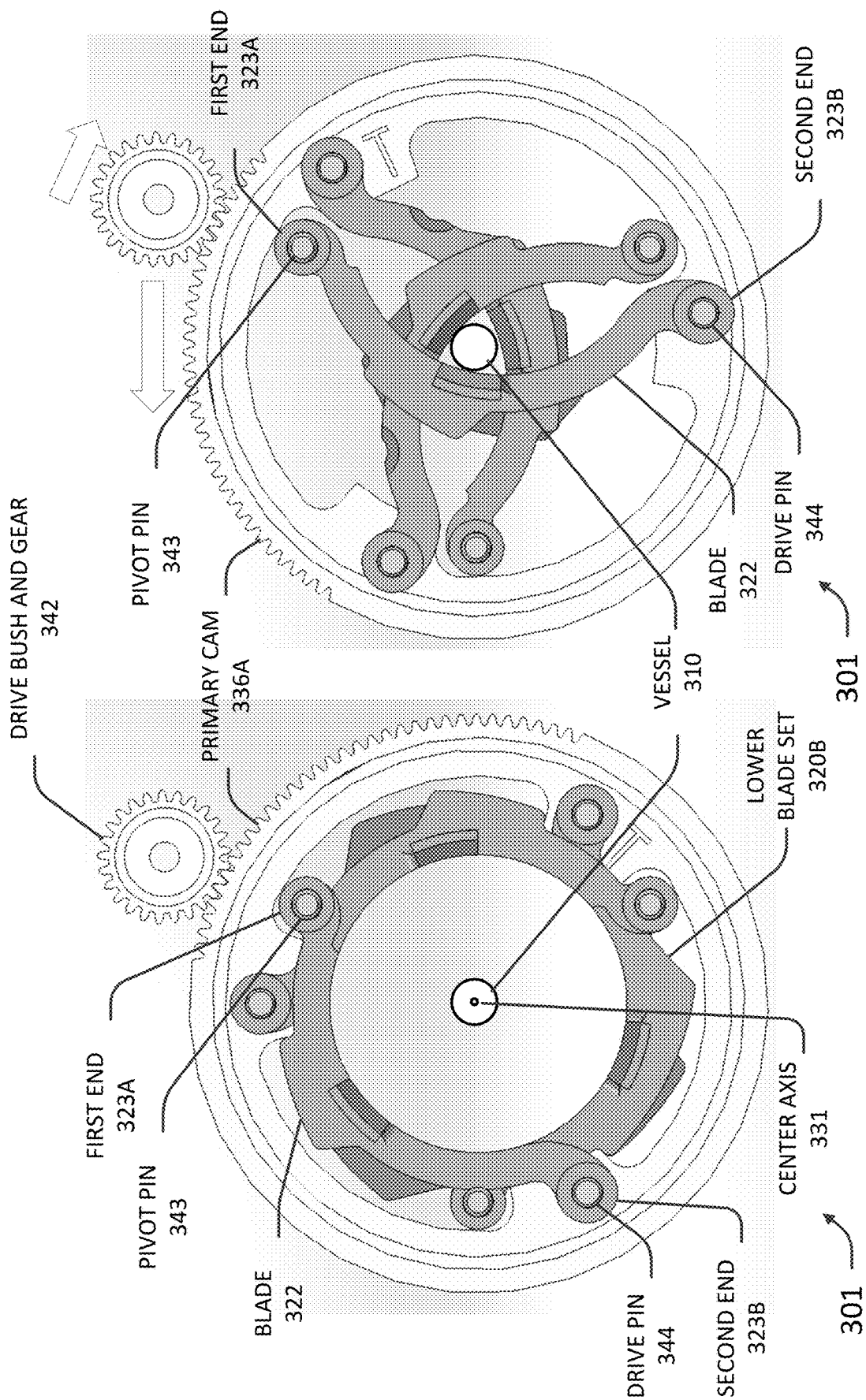

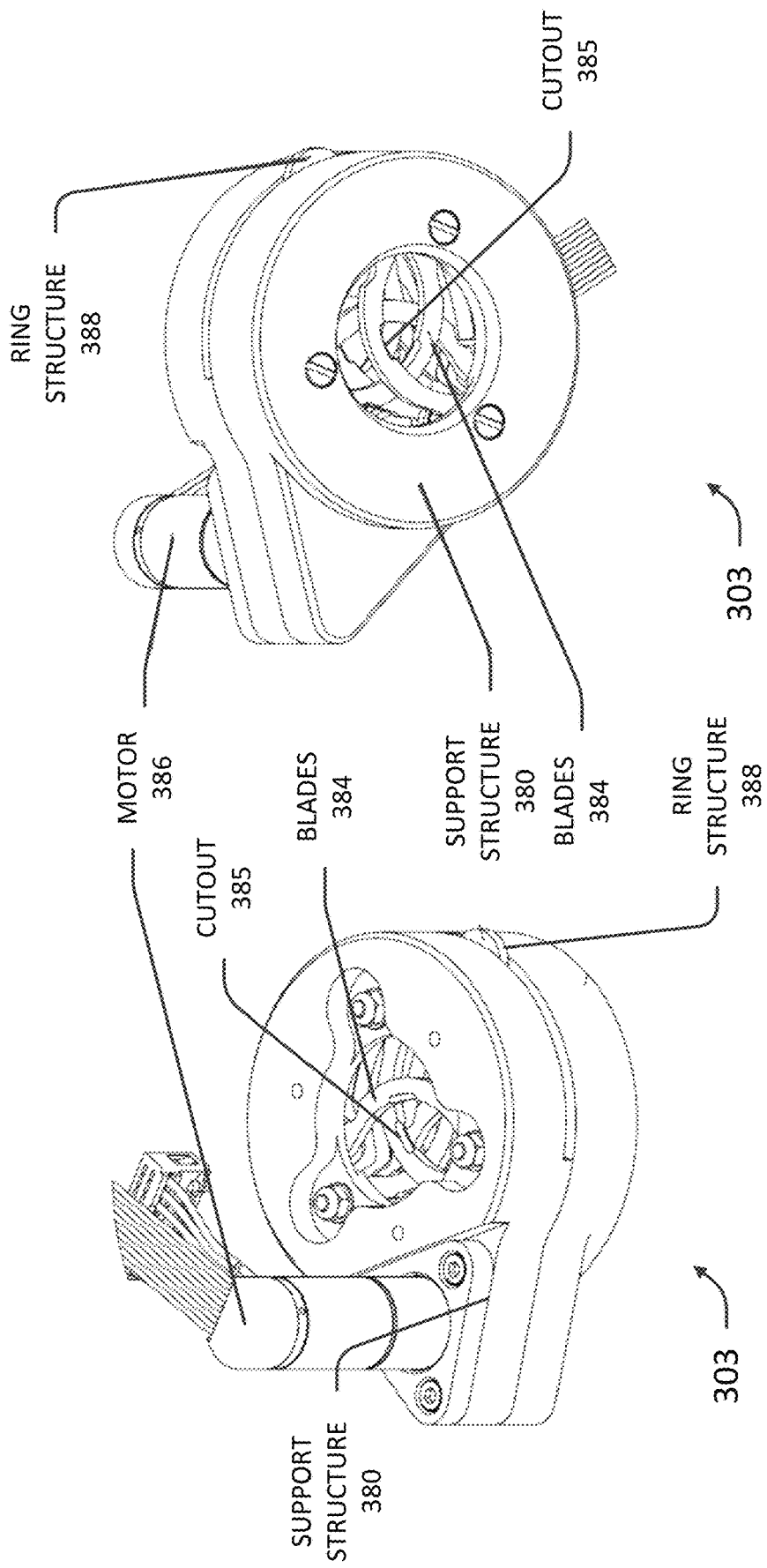

VESSEL GRIPPER

RELATED APPLICATION

This application claims priority under 35 U.S.C. § 119 or 365 to United Kingdom Application No. 2000798.5, filed Jan. 20, 2020. The entire teachings of the above application are incorporated herein by reference.

BACKGROUND

Storage freezers provide an insulated and controlled environment to accommodate a number of biological or other samples. In typical storage freezers, samples are loaded into racks or trays, each of which holds several samples. The racks or trays are manually removed from the controlled environment of the freezer, presenting the rack or tray to a user for removing samples from, or adding samples to, the storage freezer. Depending on the storage requirements of the stored samples, the storage freezer maintain the controlled environment at an appropriate temperature for preserving the samples over time.

SUMMARY

Example embodiments include an apparatus for gripping a vessel, or a portion of a vessel, such as a tube, vial, jar, cassette, plate, rack, or other container. The apparatus may include a support structure having a center axis, a motor, and a gripper stage. The gripper stage may include a plurality of blades, each of the plurality of blades having a) a first end through which a blade rotation axis extends, the blade rotation axis being fixed relative to the support structure and offset from the center axis, b) a second end that is circumferentially and radially moveable to rotate the blade about the blade rotation axis, and c) a center portion. The gripper stage may also include a ring structure coupled to the motor to rotate the ring structure around the center axis. The ring structure, as it rotates, may move the second end of each blade to rotate the blade about the blade rotation axis of the blade to shift the center portion towards the center axis to contact an outer portion of a vessel extending along the center axis.

The gripper stage may be a first gripper stage, and the apparatus may further comprise a second gripper stage. The second gripper stage may include a plurality of blades, each of the plurality of blades having a) a first end through which the blade rotation axis extends, b) a second end that is moveable by the ring structure to rotate the blade about the blade rotation axis, and c) a center portion. The ring structure may include a common ring configured to move the plurality of blades of the first and second gripper stages.

The gripper stage may further include a plurality of rotational pins, each of the plurality of rotational pins being coupled along a respective blade rotation axis to the support structure and to the first end of the respective blade, the blade rotating about the rotational pin.

The second end of each of the plurality of blades may be connected to a respective drive pin, the respective drive pin being engaged by the ring structure to move the second end of the blade to rotate the blade about the blade rotation axis. Each drive pin may be positioned to slide within a radial slot within the ring as the ring rotates. An opposed end of each drive pin may be positioned to move within a curved slot of the support structure as the ring rotates. Each drive pin is positioned to slide within a radial slot within the ring as the ring rotates.

The plurality of blades may be three blades, and each of the blades may be curved away from the center axis. In a first position prior to rotation of the ring structure, the plurality of blades may conform to an inner edge of the ring structure, and, in a second position following rotation of the ring structure, the center portion of each of the plurality of blades may contact an outer edge of the vessel. The center portion of each of the plurality of blades may include a pad or a structure positioned to contact the vessel. The plurality of blades may be adapted to grip vessels having different diameters. The apparatus may also include a controller configured to actuate the motor to control the rotation of the ring structure.

A controller may be configured to actuate the motor to control the rotation of the ring structure. The controller may rotate the ring structure a distance based on the diameter of the tube, the distance corresponding to the plurality of blades being in contact with the tube. A sensor may be configured to detect at least one of position and size of the tube, and the controller may be configured to rotate the ring structure a distance based on an output of the sensor. The sensor includes a force feedback sensor at the motor.

A picker robot may be coupled to the apparatus and may be configured to translate the apparatus between a storage location at which the vessel resides and a destination to which the vessel is to be transported. A loading device may be configured to 1) position a loading pin beneath the vessel at the storage location and 2) drive the loading pin upward to raise the vessel towards the plurality of blades.

Further embodiments may include a vessel retrieval system. The system may include a gripper configured to grip the vessel. The gripper may include a support structure having a center axis, a motor, and a gripper stage. The gripper stage may include a plurality of blades, each of the plurality of blades having a) a first end through which a blade rotation axis extends, the blade rotation axis being fixed relative to the support structure and offset from the center axis, b) a second end that is circumferentially and radially moveable to rotate the blade about the blade rotation axis, and c) a center portion. The gripper stage may also include a ring structure coupled to the motor to rotate the ring structure around the center axis. The ring structure, as it rotates, may move the second end of each blade to rotate the blade about the blade rotation axis of the blade to shift the center portion towards the center axis to contact an outer portion of a vessel extending along the center axis. The system may further include a picker robot configured to translate the gripper between a storage location at which the vessel resides and a destination to which the vessel is to be transported. A loading device may be configured to 1) position a loading pin beneath the vessel at the storage location and 2) drive the loading pin upward to raise the vessel towards the plurality of blades.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 5A-B illustrate a set of gripper blades in one embodiment.

FIGS. 10A-C illustrate a gripper in a further embodiment.

DETAILED DESCRIPTION

A description of example embodiments follows. The teachings of all patents, published applications and references cited herein are incorporated by reference in their entirety.

Figure 1:
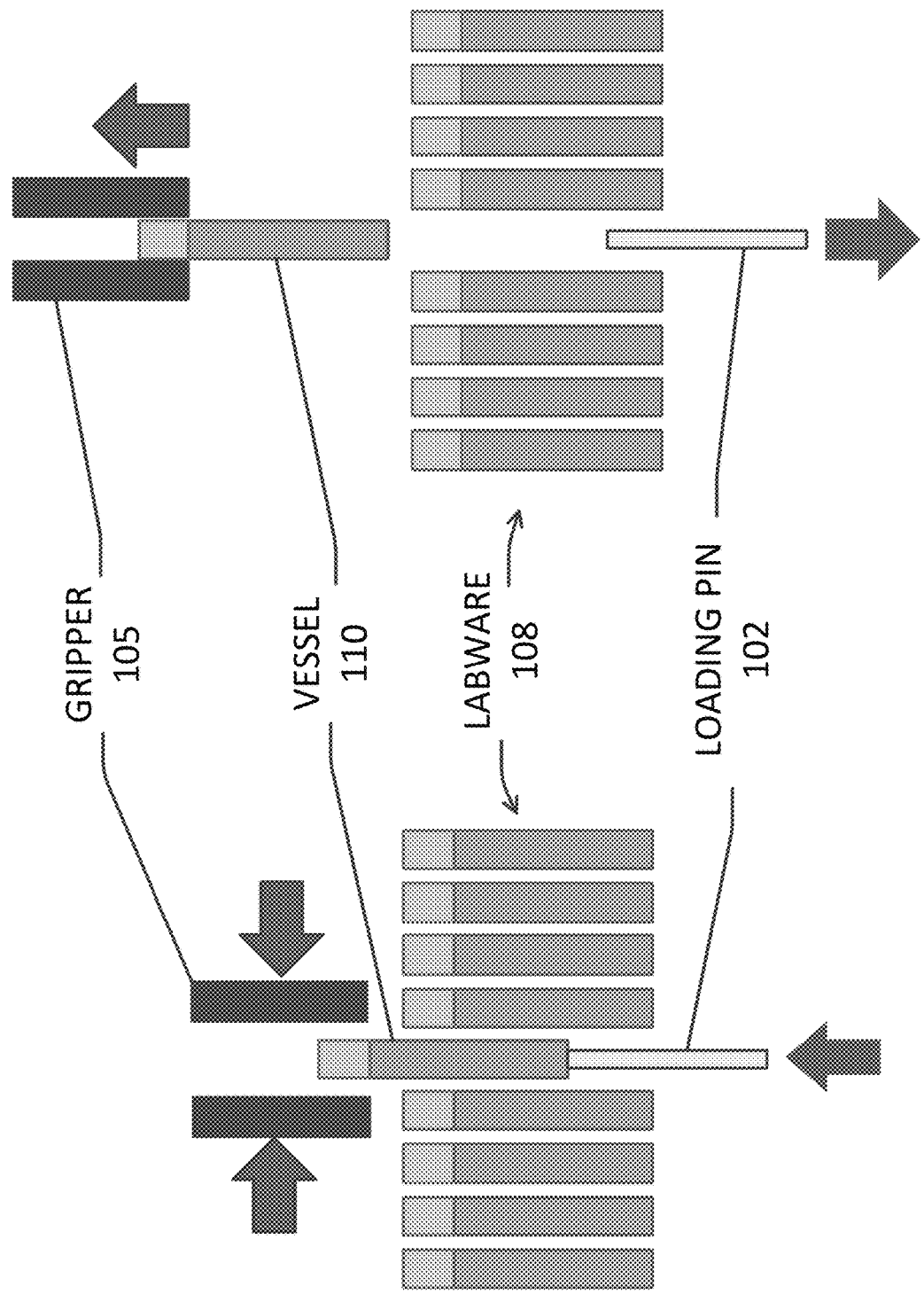
FIGS. 1A-B illustrate operation of a gripper in the prior art.

FIGS. 1A-B illustrate operation of a gripper in conventional retrieval system. Labware 108 includes a plurality of sample tubes or other vessels organized in a rack (not shown). The labware 108 may be stored in a controlled environment to preserve the samples contained therein. To remove a selected vessel 110 from the labware 108, the labware 108 may be removed from its storage environment and into a working area. Here, a loading pin 102 may be positioned under the labware, and a gripper 105 may be positioned above the labware 108. As shown in FIG. 1A, the loading pin 102 moves upward to drive the selected vessel 110 upward such that a top portion of the vessel 110 is exposed above the remainder of the labware 108. As shown in FIG. 1B, the gripper 105 then closes its fingers to grasp the top portion of the vessel 110, lifting and removing the vessel 110 from the remainder of the labware 108. An example controlled storage and retrieval system, including a gripper assembly, is described in U.S. patent application Ser. No. 16/354,993, filed on Mar. 15, 2019, the entirety of which is incorporated herein by reference.

Figure 2:
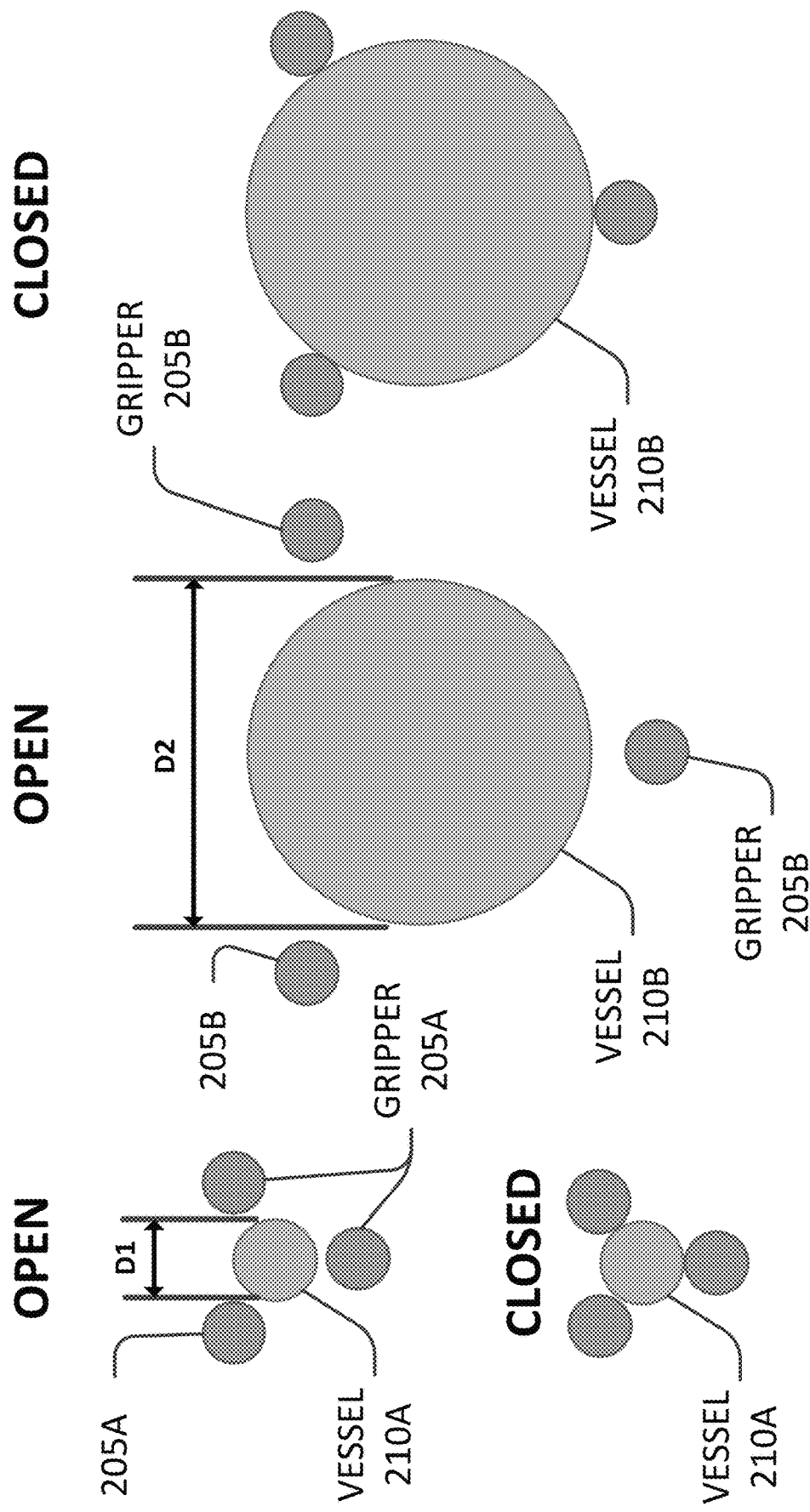
FIGS. 2A-B illustrate application of a gripper to vessels of different sizes.

FIGS. 2A-B are top-down views illustrating application of a gripper to vessels of different sizes in the prior art. As shown in FIG. 2A, a vessel 210A having a diameter D1 is gripped by a gripper having three gripper fingers 205A. In the open position, the gripper is positioned such that the gripper fingers 205A are located around the vessel 210A. In the closed position, each of the gripper fingers 205A is moved toward the vessel 210A, contacting the surface of the vessel 210A to maintain a grip on the vessel 210A.

As shown in FIG. 2B, a larger vessel 210B having a diameter D2 is gripped by a gripper having three gripper fingers 205B. As in the gripper of FIG. 2A, the gripper fingers 205B are located around the vessel 210B in the open position, and are moved toward the vessel 210B in the closed position to grip the vessel 210B, contacting the surface of the vessel 210B to maintain a grip on the vessel 210B.

As illustrated by the vessels 210A-B, there is a wide range of cylindrical and other labware that may require manipulation by an automated gripper. Such labware may be organized in racks and stored in a controlled environment, where an automated gripper may locate and move a single vessel between racks or between a storage environment and an input/output port. There can be a multitude of differences between types of labware, including tubes and vials of various diameters, shapes and surface features. The differences in major diameter is one factor that limits the ability to manipulate a range of labware with the same gripper. Conventional grippers often have a range limit defined by their stroke, but the form of the gripper fingers can also be a limiting factor. For example, fingers required to grip small objects provide a small contact section for larger objects, which can present problems for securely gripping those larger objects. Moreover, when fully open, a gripper with thin fingers can let objects fall through the gaps between them. Finger size may be restricted by the minimum grip range (zero stroke position) and, as a result, the grippers tend to have limits to their practical grip range. Thus, conventional grippers are often unable to consistently and efficiently grip labware having smaller and larger diameters.

A further challenge to conventional grippers is that labware can tilt as it leaves its supporting rack. Accordingly, it is advantageous for a gripper to catch a vessel before gripping it. To do so, the gripper may be configured such that the open position is close to the diameter of the vessel. However, conventional grippers may be unable to catch vessels of widely different sizes due to the limitations on their finger size and grip range described above.

Many conventional grippers also rely on sliding contact parts that require precise machining or the use of proprietary linear guides. They may also require a means of converting rotary drive to linear motion, such as rack and pinion drives. Conventional grippers also have a direct relationship between stroke and physical size, making them space inefficient in some applications.

Figure 3:
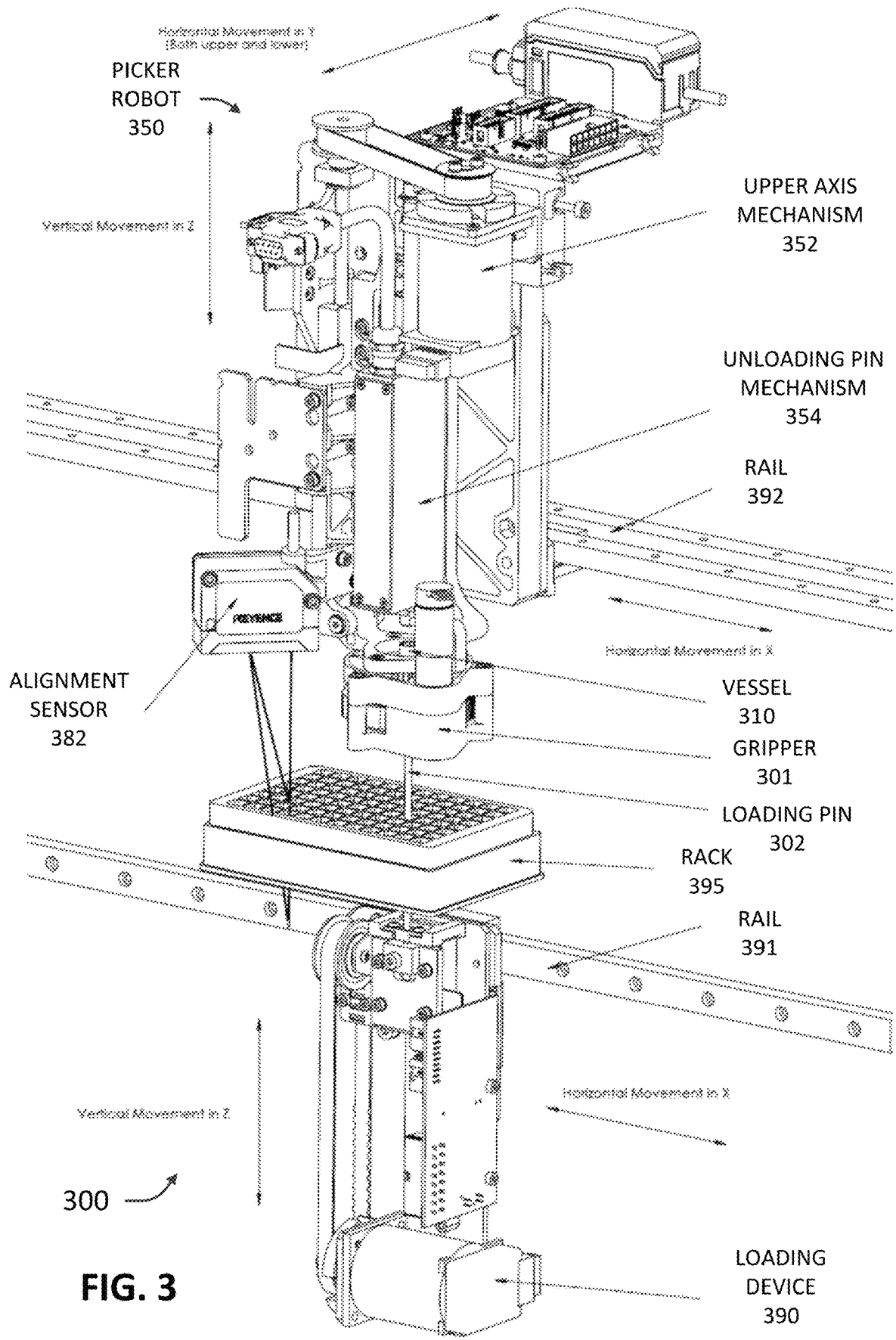
FIG. 3 illustrates a vessel retrieval system in one embodiment.

FIG. 3 illustrates a vessel retrieval system 300 that includes a gripper 301 in an example embodiment. The gripper 301 may be mounted to a picker robot 350 configured to locate, grasp and move sample vessels within a rack 395 or between the rack 395 and another storage unit such as a second rack (not shown). The picker robot 350 may be coupled to a rail 392 and configured to move laterally (x-direction) along the rail 392. The picker robot 350 may also include driving mechanisms, such as the upper axis mechanism 352, for moving the gripper 301 perpendicular to the rail 392 (y-direction) and vertically (z-direction). As such, the picker robot 350 can move the gripper 301 in three dimensions as required to grasp and move sample vessels. Likewise, a loading device 390 residing below the rack 395 may be coupled to a rail 391 and may include driving mechanisms for moving a loading pin 302 in three dimensions. The loading pin 302 may extend vertically from the top of the loading device 390, and can be driven through the rack 395 by the loading device to raise a vessel vertically and partially out of the rack 395.

As shown in FIG. 3, the gripper 301 is gripping a selected vessel 310 that has been removed from the rack 395. To remove the selected vessel 310 from the rack 395, the picker robot 350 may first position the gripper 301 above a selected vessel residing in the rack 395. To accurately position the gripper 301 and, optionally, the loading pin 302, the picker robot 350 may employ an alignment sensor 382, which may utilize laser, infrared, video or other sensors to determine the position of the gripper 301 relative to the rack 395. Concurrently, the loading device 390 may position the loading pin 302 directly below the selected vessel 310. The loading device 390 may then drive the loading pin upward and through the rack 395, contacting the selected vessel 310 and driving the selected vessel 310 upward until at least a top portion of the vessel 310 is exposed above the rack 395. The gripper 301 may concurrently catch the vessel 310 within a cavity of the gripper 301. When a sufficient portion of the vessel 310 is positioned within the gripper 301, the gripper may engage to securely grip the vessel 310. Once the vessel 310 is secured, the loading device 390 may then retract the loading pin 302, returning it to a position below the rack 395.

After securing the vessel 310 in the gripper 301, the picker robot 350 may place the vessel 310 to a destination, which may be a different slot of the rack 395 or a different rack or storage unit (not shown). To do so, the gripper 301 and, optionally, the loading device 390, may first relocate to the destination. The gripper 301 may then disengage to release the vessel 310, lowering it into the destination. To assist in releasing the vessel 310, an unloading pin mechanism 354 may lower an unloading pin (not shown) to contact the top of the vessel 310 and drive the vessel 310 downward. The vessel 310 may be lowered in a controlled manner with the aid of the loading device 390, which may support the bottom of the vessel 310 as it is lowered into the destination.

Figures 4A, 4B:
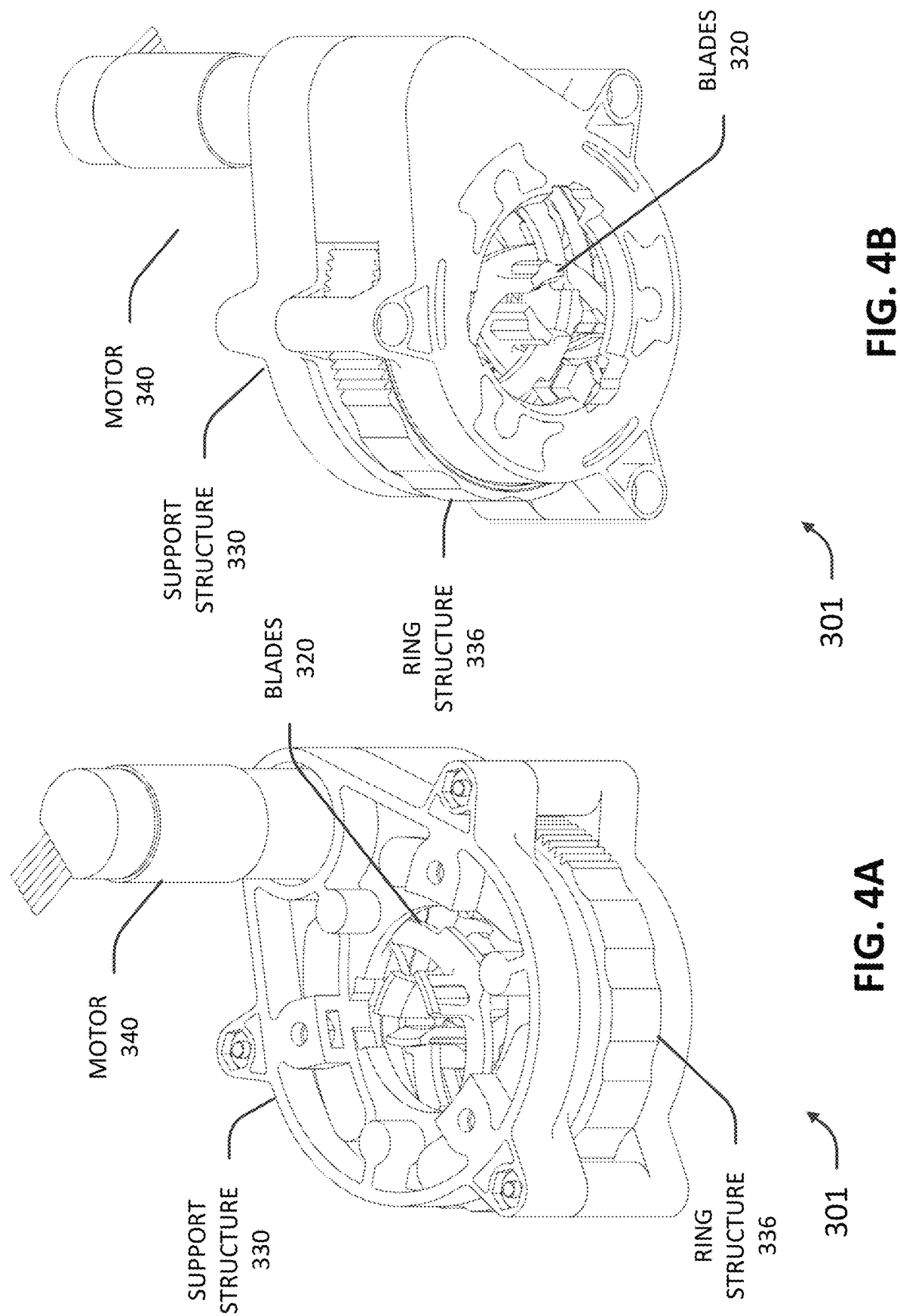
FIG. 4A-D illustrate a gripper in one embodiment.

FIGS. 4A-B illustrate the gripper 301 in further detail. As shown, a motor 340 is mounted to a support structure 330, which encompasses a ring structure 336. A set of blades 320 resides within the support structure 330. The motor 340 may include a servo motor having sensors for detecting movement and velocity, and may drive rotation of the ring structure 336 relative to the support structure 330. Though this rotation, the ring structure 336 may move the blades 320 towards or away from a vertical center axis of the support structure 336. In doing so, the blades 320 may grip a vessel or other object that is placed within the support structure. The motor 340 and/or a transmission (not shown) in connection with the motor 340 may be configured to enable the contact pressure exerted by the blades 320 on the vessel to be varied. The contact pressure may be selected based on known properties of the vessel. For example, contact pressure may be set lower for vessels with fragile surfaces, and may be set higher for stronger, heavier vessels or vessels with a compliant material at an outer surface. A controller (described below) controlling the motor 340 and/or transmission may select the contact pressure accordingly, and the motor 340 may respond by varying its output torque or motor speed.

Figure 4C:
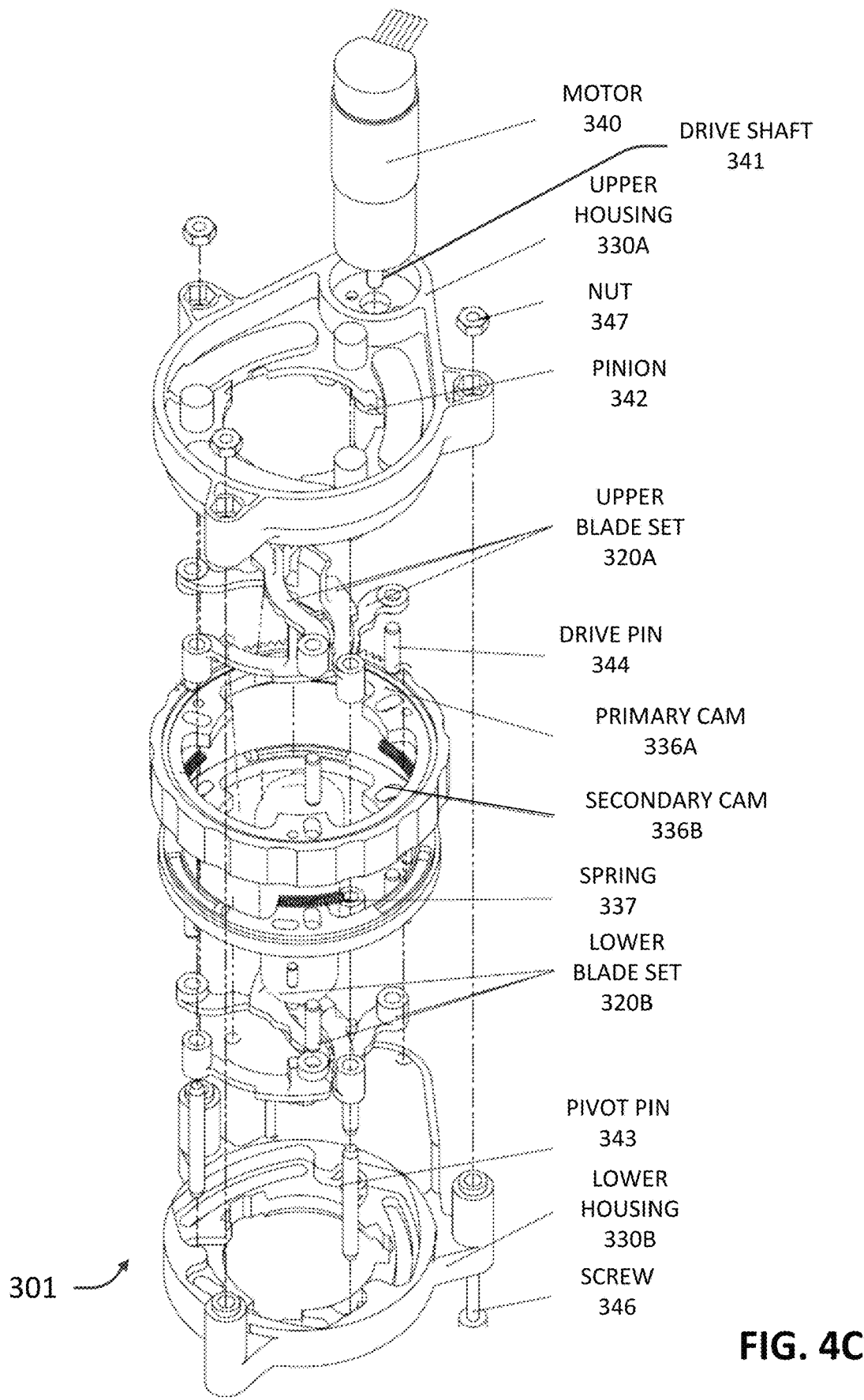

FIG. 4C is an exploded view of the gripper 301. The support structure 330 includes an upper housing 330A and a lower housing 330B, which are joined by a set of screws 346 that screw into respective nuts 347. The motor 340 may be mounted to a top surface of the upper housing 330A, and may connected to a pinion 342 via a drive shaft 341. The drive shaft 341 may comprise a rigid drive member such as, for example, a solid metal shaft, or a flexible drive member such as, for example, a flexible cable drive. In some embodiments, the motor 340 is located remotely from pinion 342 such as, for example, in a location with a different (e.g., warmer) ambient temperature than the ambient temperature in the vicinity of gripper 301. Such a configuration may enable the motor 340 to be maintained at a temperature at or above −20° C., while the remainder of the gripper may operate in an environment at −80° C., for example. The ring structure 336 may include a primary cam 336A and a secondary cam 336B. The primary cam 336A, as shown, may include gear teeth at an outer surface, and the teeth may mesh with the pinion 342, enabling the motor 340 to drive rotation of the primary cam 336A relative to the support structure 330. The secondary cam 336B may be fixed to the primary cam 336A to rotate in synchronization with the primary cam 336A.

The blades 320 may include an upper blade set 320A and a lower blade set 320B. The upper blade set 320A may be positioned between the upper housing 330A and the primary cam 336A, while the lower blade set 320B may be positioned between the secondary cam 336B and the lower housing 330B. The upper blade set 320A and lower blade set 320B may each include a plurality of blades, and each of the blades may have first and second ends. The first ends may be connected to a respective pivot pin (e.g., pivot pin 343), wherein the pivot pin may extend partially or fully through an aperture at the first end. Alternatively, the pivot pins may be integral to the blades, extending from the first end of each blade. The pivot pins may be rotationally fixed at one or both ends by the upper housing 330A and/or the lower housing 330B. Thus, the first ends of the blades 320A-B may be fixed relative to the support structure 330. The second ends of the blades 320A-B may be connected to a respective drive pin (e.g., drive pin 344), wherein the drive pin may extend partially or fully through an aperture at the second end. Alternatively, the drive pins may be integral to the blades, extending from the second end of each blade. The drive pins may extend into or through an aperture of the primary cam 336A and/or secondary cam 336B such that the drive pins move with the primary and secondary cams 336A-B. Thus, the second ends of the blades 320A-B may be moved by the primary and secondary cams 336A-B. As described in further detail below, this movement causes the blades 320A-B to move a center portion of the blades 320A-B towards the center axis of the support structure 330A-B, thereby contacting and gripping a vessel located within the gripper 301.

The center portion of the blades 320A-B may include a pad or broadened surface, as shown, to increase contact area with a vessel. During this movement, one or more springs (e.g., spring 337 located at the primary and/or secondary cams 336A-B may apply a force to one or more of the blades 320A-B and/or the pins 343, 344, assisting in the movement of one or more of the blades 320A-B. For example, the springs may be implemented at the lower blade set 320B to assist in gripping a tapered vessel having a larger upper diameter and a smaller lower diameter. In such an application, the springs may advance the lower blade set 320B farther towards a center axis than the upper blade set 320A, thereby causing the lower blade set 320B to grip the smaller diameter of the tapered vessel while the upper blade set 320A grips the larger diameter of the tapered vessel. Because the springs provide elasticity to the grip under this configuration, the lower blade set 320B may serve to stabilize the tapered vessel, while the upper blade set 320A may server to securely grip and move the vessel. Alternatively, a wire form or other mechanical element may be implemented to advance the upper and/or lower blade set 320A-B when gripping a vessel. An example operation of gripping a tapered vessel is described in further detail below with reference to FIGS. 9A-C.

Figure 4D:
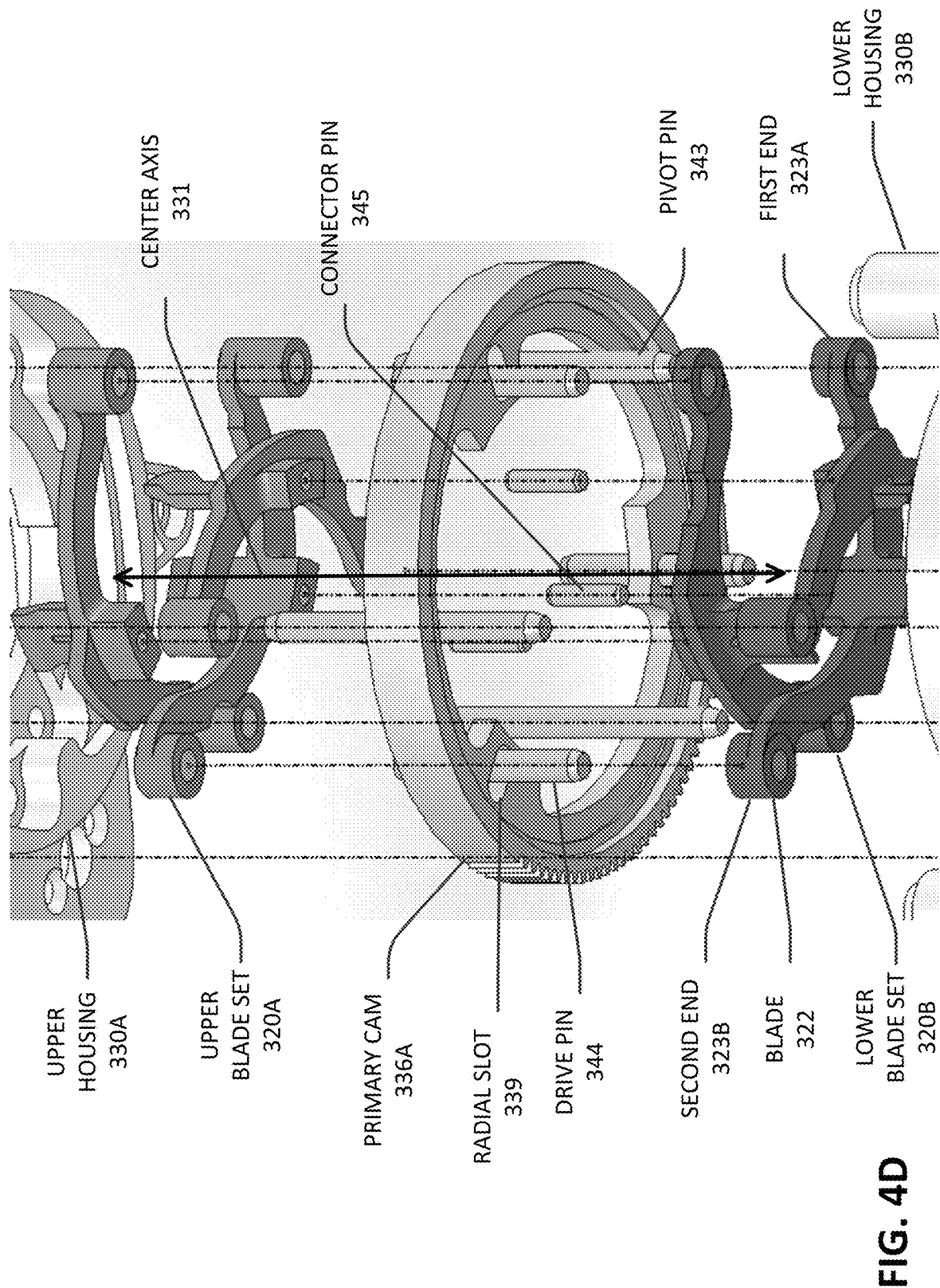

FIG. 4D is an exploded view of the gripper 301 with attention to the blades 320A-B and connected components. For clarity, the primary cam 336A is shown, but the secondary cam 336B is omitted. The upper and lower blade sets 320A-B each include three blades. For illustrative purposes, a single blade 322 of the lower blade set 320B is referenced. The blade 322 has a first end 323A and a second end 323B. When assembled, the pivot pin 343 extends through the first end 323A, and the drive pin 344 extends through the second end 343B. The pivot pin 343 may also be fixed or otherwise connected to the upper and/or lower housing 330A-B. As shown, the primary cam 336A may include a cutaway or other shape along its inner edge to enable movement of the primary cam 336A without colliding with the pivot pin 343. In contrast, the drive pin 344 may extend through a radial slot 339 in the primary cam 336A. The radial slot 339 may allow for the sweep of the blades 320A-B as they are moved by the primary cam 336A. Optionally, a center portion of the blade 322 may be linked to a blade of the upper blade set 320A via a connector pin.

Thus, the gripper 301 may include a gripper stage having a plurality of blades 320A-B and a ring structure 336 including the primary cam 336A and, optionally, the secondary cam 336B. Each of the plurality of blades 320A-B may have a first end (e.g., first end 323A) through which a blade rotation axis extends, wherein the blade rotation axis may be fixed relative to the support structure (e.g., via pivot pin 343) and offset from a center axis 331 of the support structure 330. Each of the plurality of blades 320A-B may further have a second end (e.g., second end 323B) that is circumferentially and radially moveable (e.g., via drive pin 344) to rotate the blade 322 about the blade rotation axis. The primary cam 336A may be coupled to the motor 340 to rotate the primary cam 336A around the center axis 331. As it rotates, the primary cam 336A may move the second end 323B of each blade 322 to rotate the blade 322 about the blade rotation axis of the blade 322 to shift the center portion of the blade 322 towards the center axis 331 to contact an outer portion of a vessel (not shown) extending along the center axis 331. By supporting the blades 320A-B at both ends (e.g., via the support structure 330 supporting the first ends and the ring structure 336 supporting the second ends), the gripper 301 may improve the stiffness of the blades 320A-B and the gripping force that may be applied to a vessel.

As shown, each of the blades 320A-B forms an arc shape having squared edges, and includes a center portion having a broader surface at the interior edge where contact with a vessel is made. The center portion may also be flared outward to accommodate vessels of varying shapes. In further embodiments, the blades 320A-B may form a range of other shapes. For example, the blades 320A-B may comprise one or more linear segments rather than an arc shape, and may have rounded or otherwise blunted edges. Further, the center portion may include a padded surface or other feature adapted to contact a vessel. The blades 320A-B may be composed of a range of materials depending on a desired application, such as metal (e.g., stainless steel), ceramic, plastic, or a composite, and this material may differ from the material from which the support structure 330 or ring structure 336 are composed. For example, a stiff, substantially non-compliant blade (e.g., metal or ceramic) may be desirable for reliability, precision and durability in applications requiring frequent cycles of vessel gripping. In other applications, a more compliant (e.g., plastic) blade and/or contact pad may be desirable, such as when gripping vessels having a fragile surface. Further, the blades 320A-B may be formed of multiple different materials. For example, the center portion of the blades, or a gripping surface of the center portion, may be composed of a more compliant material than the ends of the blades 320A-B, or may include a layer of a padded material adapted to contact the vessel. The blades 320A-B, or a portion of the blades (e.g., a contact pad at the center portion) may also be replaceable within the gripper 301.

FIGS. 5A-B provide a bottom-up view of the gripper 301, illustrating movement of the lower blade set 320B as the primary cam 336A rotates. The upper blade set 320A, located behind the lower blade set 320B in this view, may move in synchronization with the lower blade set 320B. FIG. 5A illustrates the gripper 301 in an "open" position, while FIG. 5B illustrates the gripper in a "closed" position. In the open position of FIG. 5A, interior edges of the lower blade set 320B overlap to form a ring shape encompassing a cavity within the gripper 301. In particular, the blade 322 occupies an upper left portion of the ring shape, and is held in place by the pivot pin 343 though the first end 323A and the drive pin 344 through the second end 323B. The vessel 310 is located along the center axis 331, and, thus, is surrounded by the blades 320A-B.

As the motor 340 (FIG. 4A-C) actuates the pinion 342, the primary cam 336A rotates around the center axis 331. This rotation also moves the second ends (e.g., second end 323B) of the blades 320A-B via the drive pins (e.g., drive pin 344) around the center axis 331. Because the first ends of the blades 320A-B may remain stationary relative to the support structure 330, the blades 320A-B move such that a center portion of the blades move toward the center axis 331. This movement may continue until, as shown in FIG. 5B, the center portion of the blades 320A-B meet with the vessel 310, gripping the vessel 310 in the closed position. Prior to gripping the vessel 310, the blades 320A-B may "catch" the vessel 310 if it is located away from the center axis 331 or if it is tilted away from the center axis 331. Thus, the blades 320A-B may capture the vessel 310 regardless of its position or orientation within the cavity of the gripper 301, and may reposition and reorient the vessel 310 as it closes on the vessel 310, ensuring a secure and consistent grip on the vessel 310.

Figures 6A, 6B:
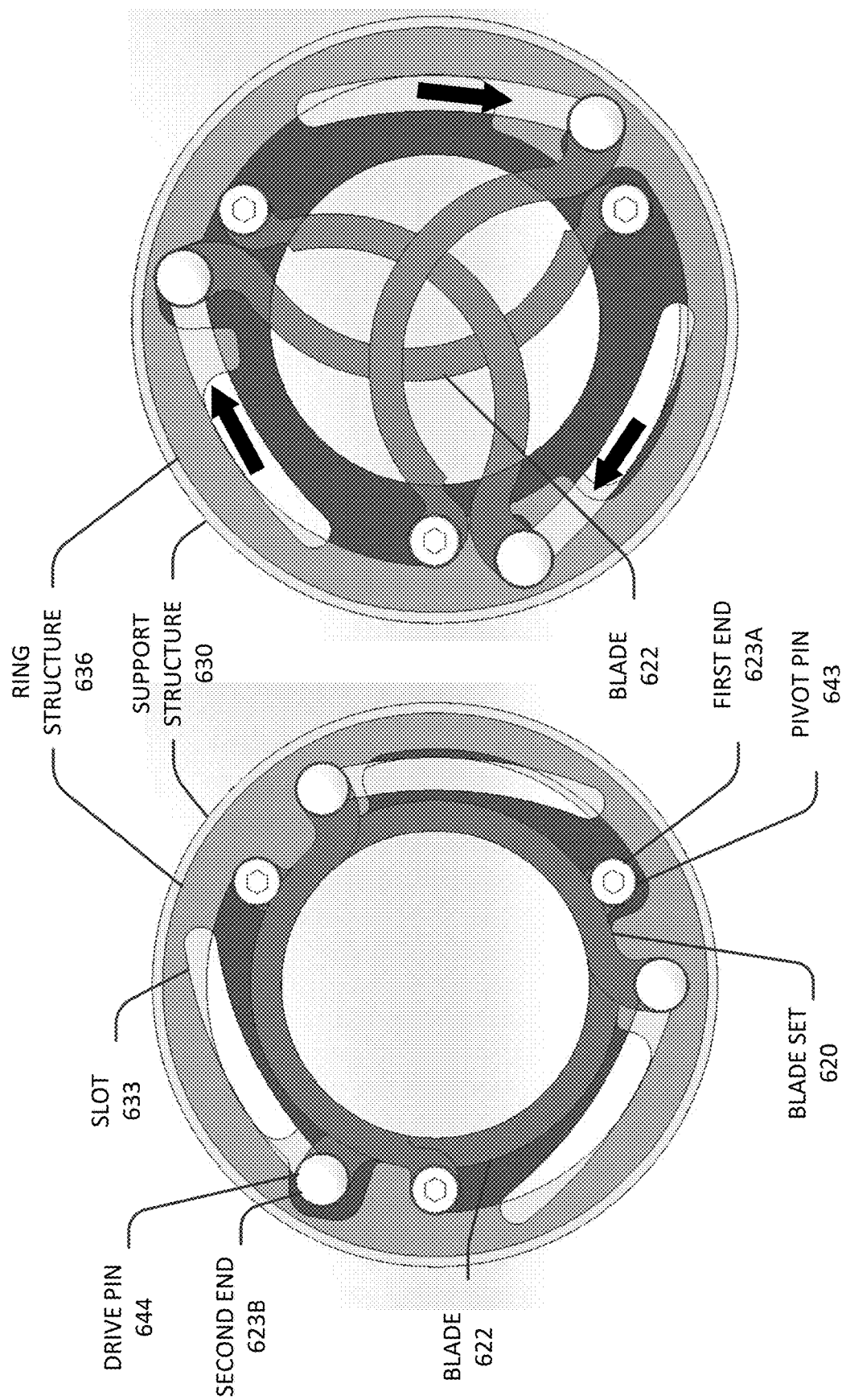
FIGS. 6A-B illustrate a set of gripper blades in a further embodiment.

FIGS. 6A-B provide a bottom-up view of a support structure 630 and a ring structure 636 in a further embodiment. The structures 630, 636 may be incorporated into the gripper 301 described above 301, and likewise may incorporate one or more features of the support structure 330 and ring structure 336 described above. In addition to the aforementioned features, the support structure 630 may include a plurality of curved slots, including slot 633, which may guide or enable movement of the drive pins (e.g., drive pin 644) as they are moved by the ring structure 636. In particular, a blade set 620 includes three blades, where one of the blades, blade 622, is held by a pivot pin 643 at a first end 623A and a drive pin 644 at a second end 623B. As the blade 622 moves from the open position of FIG. 6A to the closed position of FIG. 6B, the drive pin 644 moves the second end 623B clockwise along the slot 633. Thus, the slot 633 of the support structure 630 may guide the movement of the blade 622 as it closes to grip a vessel.

Figure 7B:
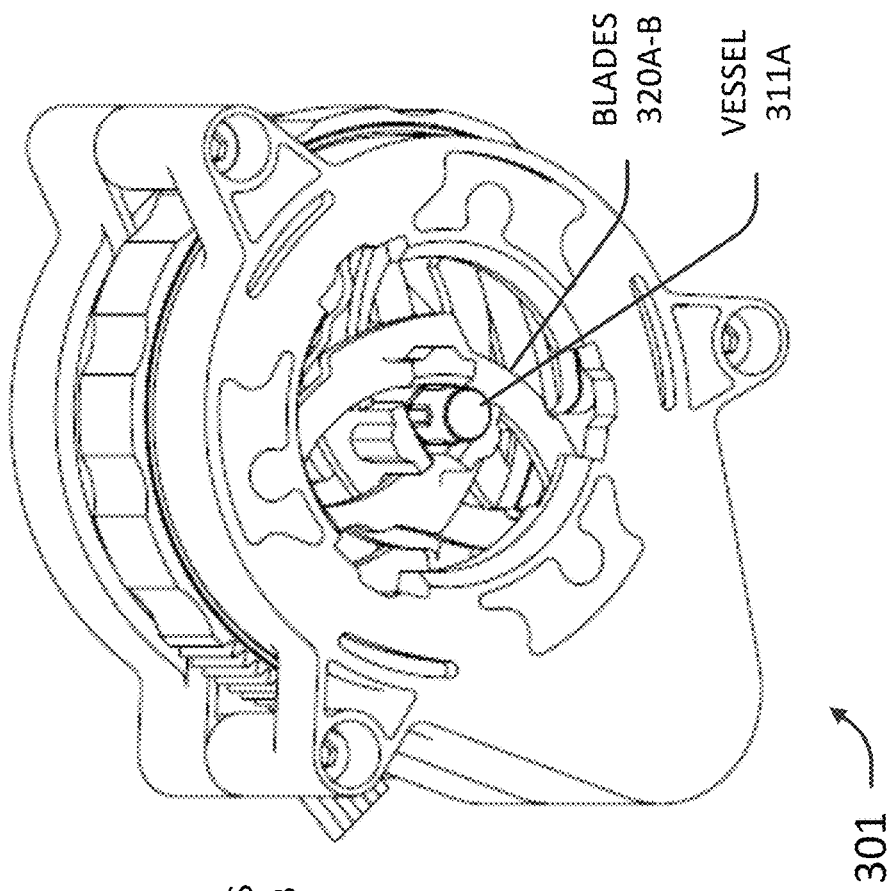
FIGS. 7A-C illustrate a gripper gripping a small vessel in one embodiment.
Figure 7A:
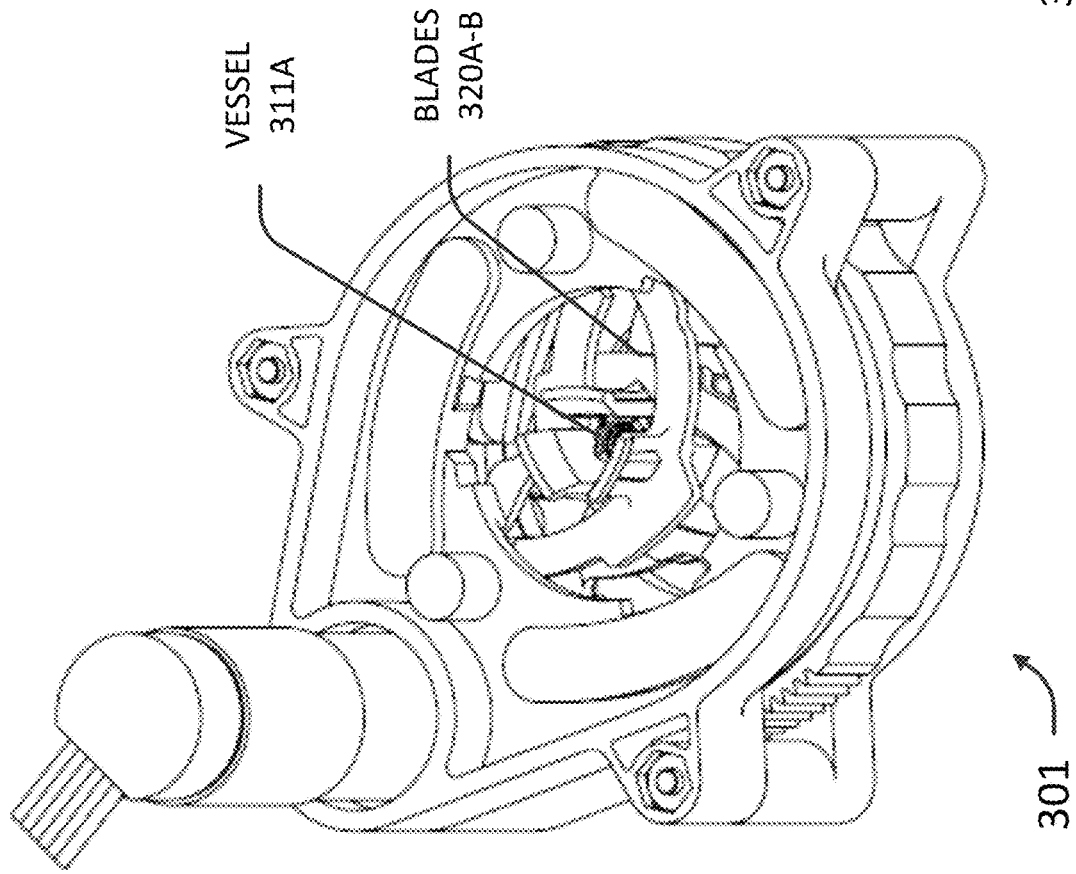
Figure 7C:
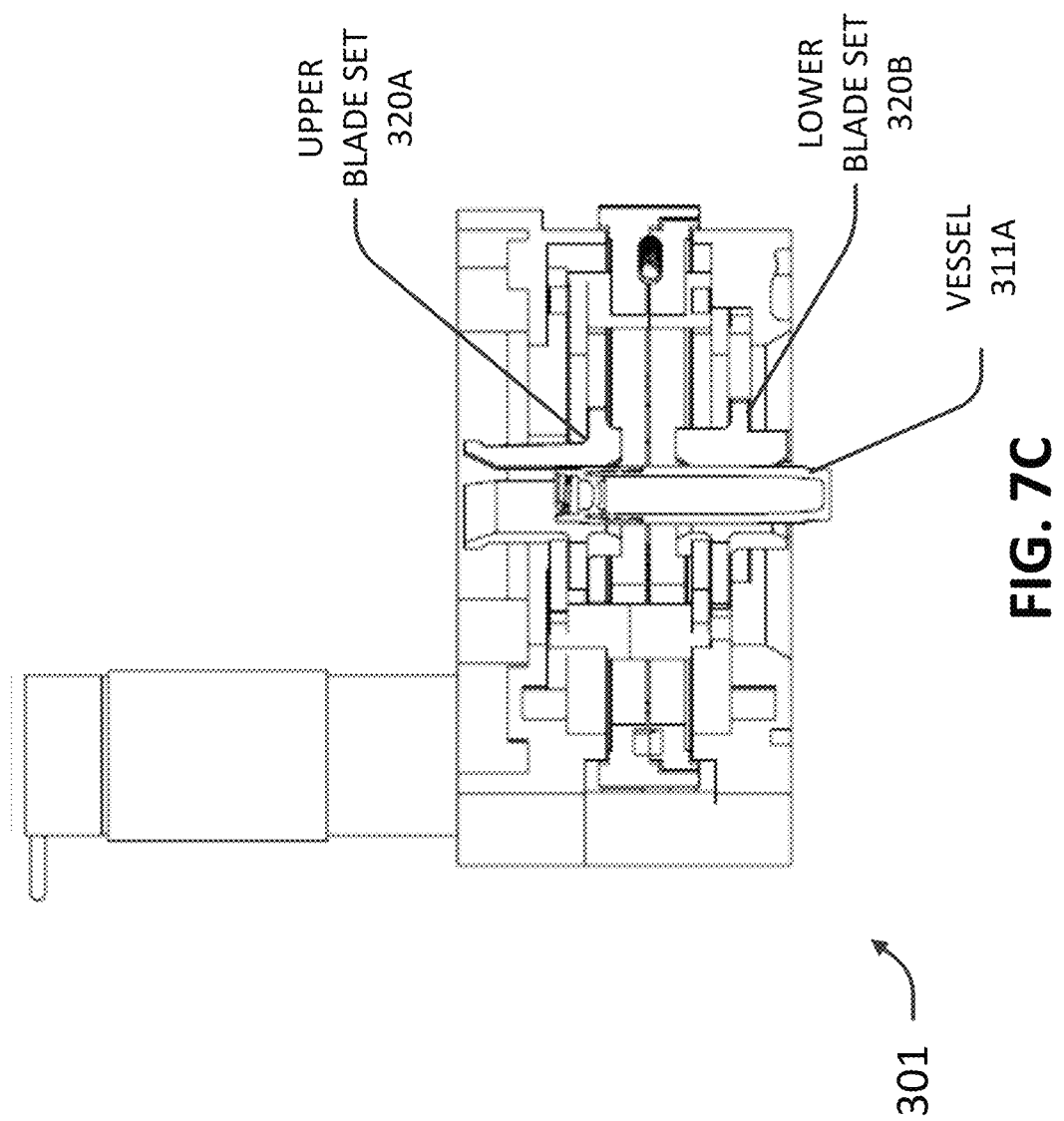

FIGS. 7A-C illustrate the gripper 301 gripping a small vessel 311A. FIGS. 7A-B show perspective views, while FIG. 7C shows a lateral cross-section view of the gripper 301. The blades 320A-B, in the closed position, surround and securely grip the vessel 311A. As shown in FIG. 7C, the upper blade set 320A grips a top portion of the vessel 311A, and the lower blade set 320B grips a lower portion of the vessel 311A. A bottom portion of the vessel 311A may extend from the bottom portion of the gripper 301, which can assist in placing the vessel 311A at its destination by entering a slot of a rack or other storage unit prior to the gripper 301 releasing the vessel 311A.

Figure 8B:
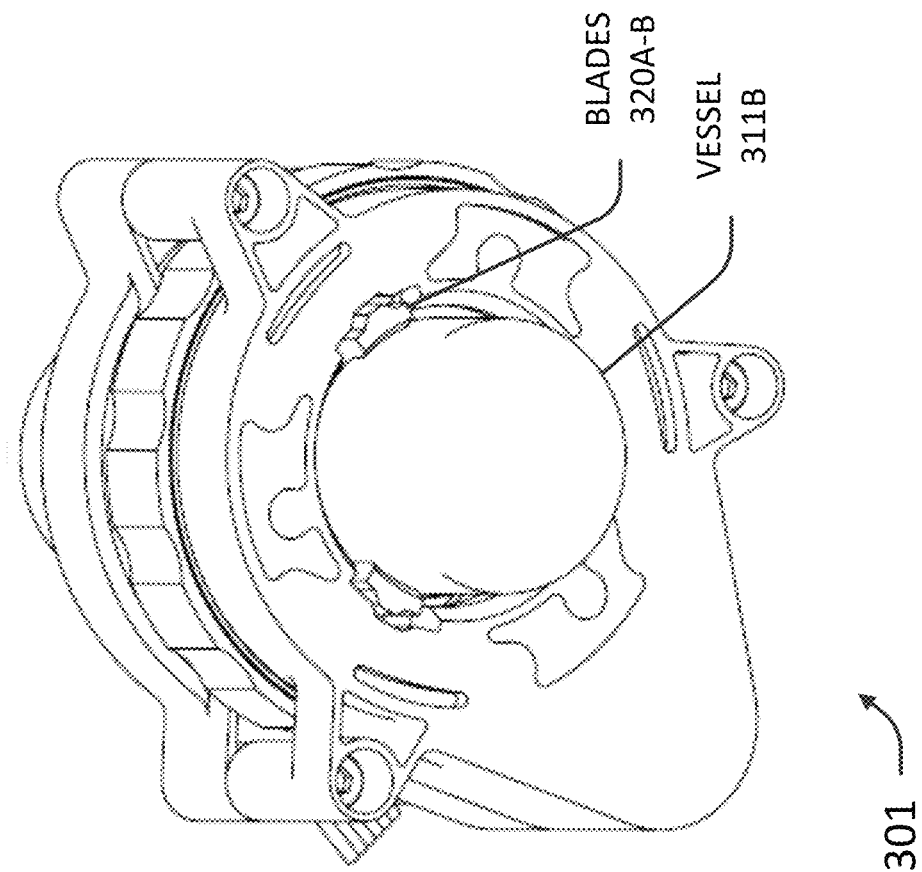
FIGS. 8A-C illustrate a gripper gripping a large vessel in one embodiment.
Figure 8A:
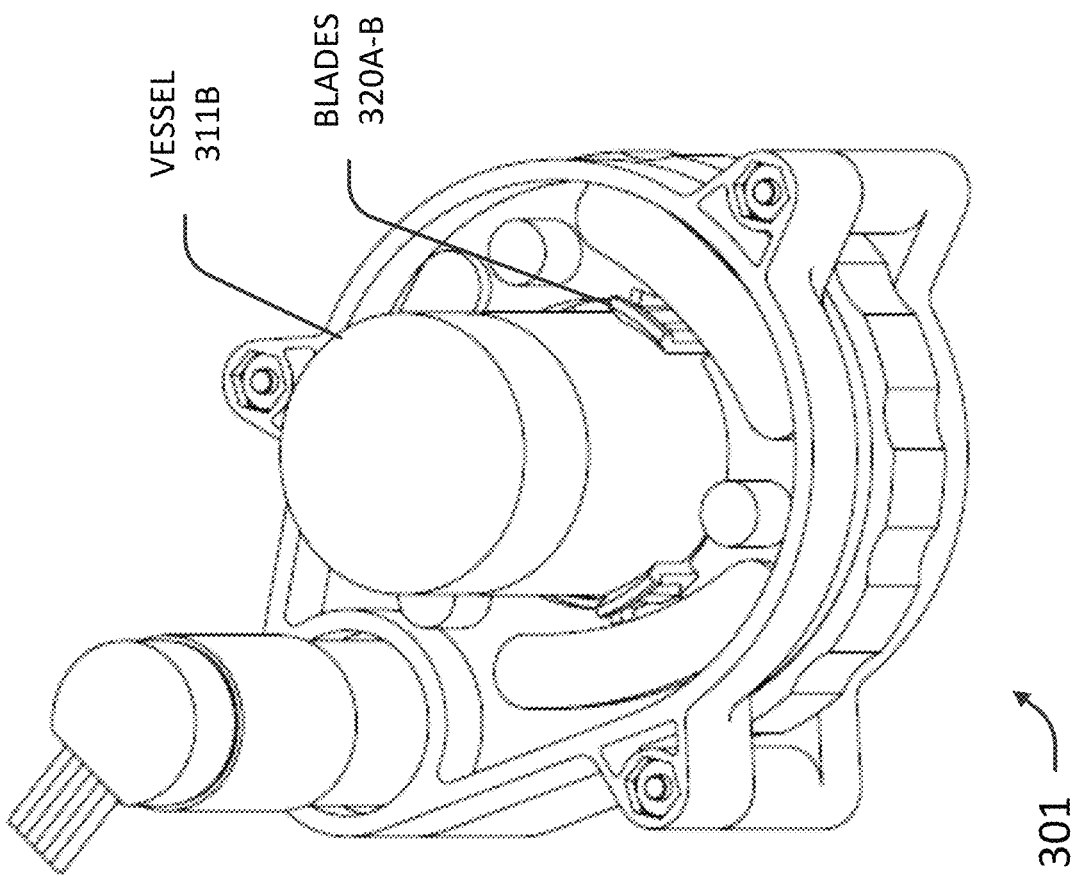
Figure 8C:
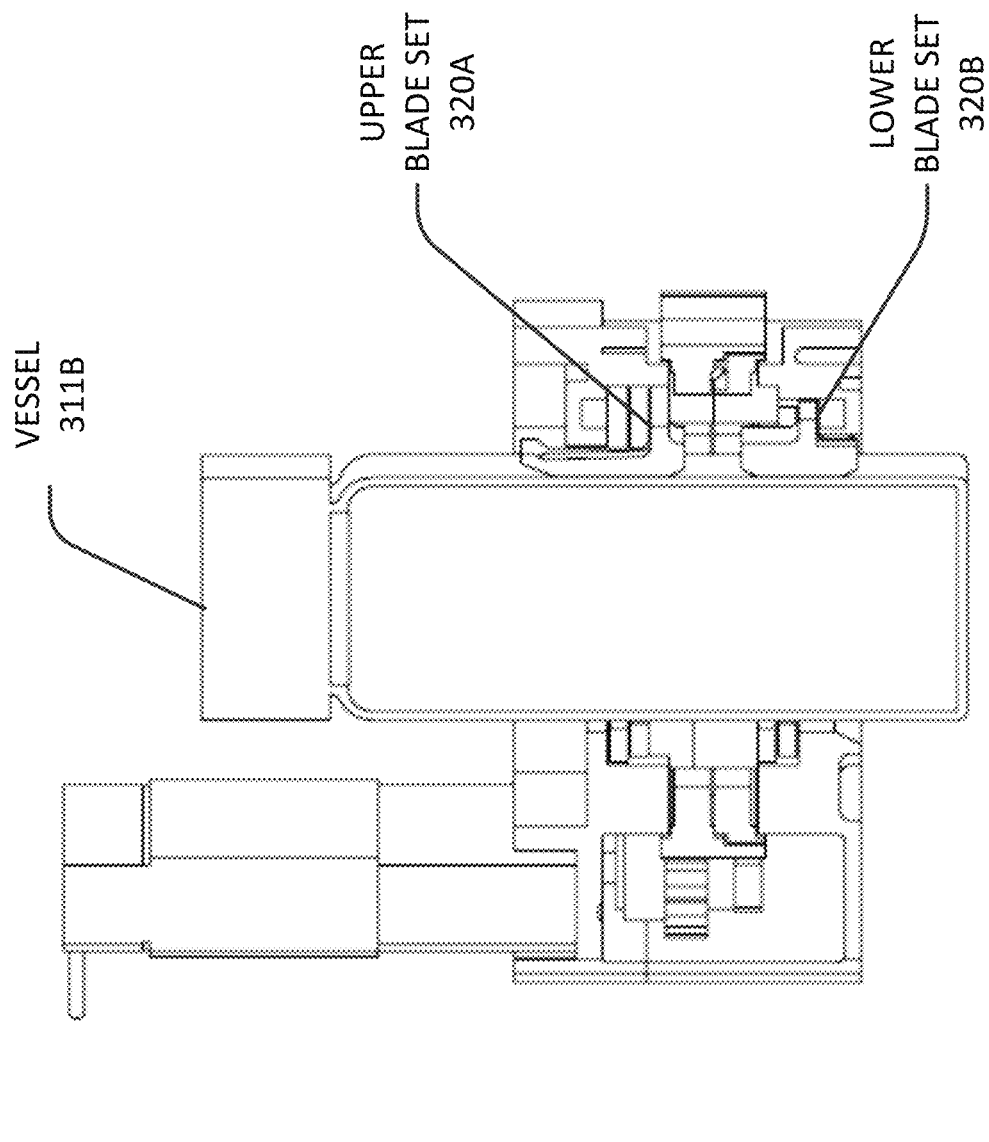

FIGS. 8A-C illustrate the gripper 301 gripping a large vessel 311B. FIGS. 8A-B show perspective views, while FIG. 8C shows a lateral cross-section view of the gripper 301. In contrast to the operation shown in FIGS. 7A-C, the blades 320A-B are positioned close to the fully-open position in order to accommodate the larger diameter of the vessel 311B. Yet, similarly, the blades 320A-B surround and securely grip the vessel 311B. As shown in FIG. 7C, the upper blade set 320A grips a top portion of the vessel 311B, and the lower blade set 320B grips a lower portion of the vessel 311B.

Figure 9B:
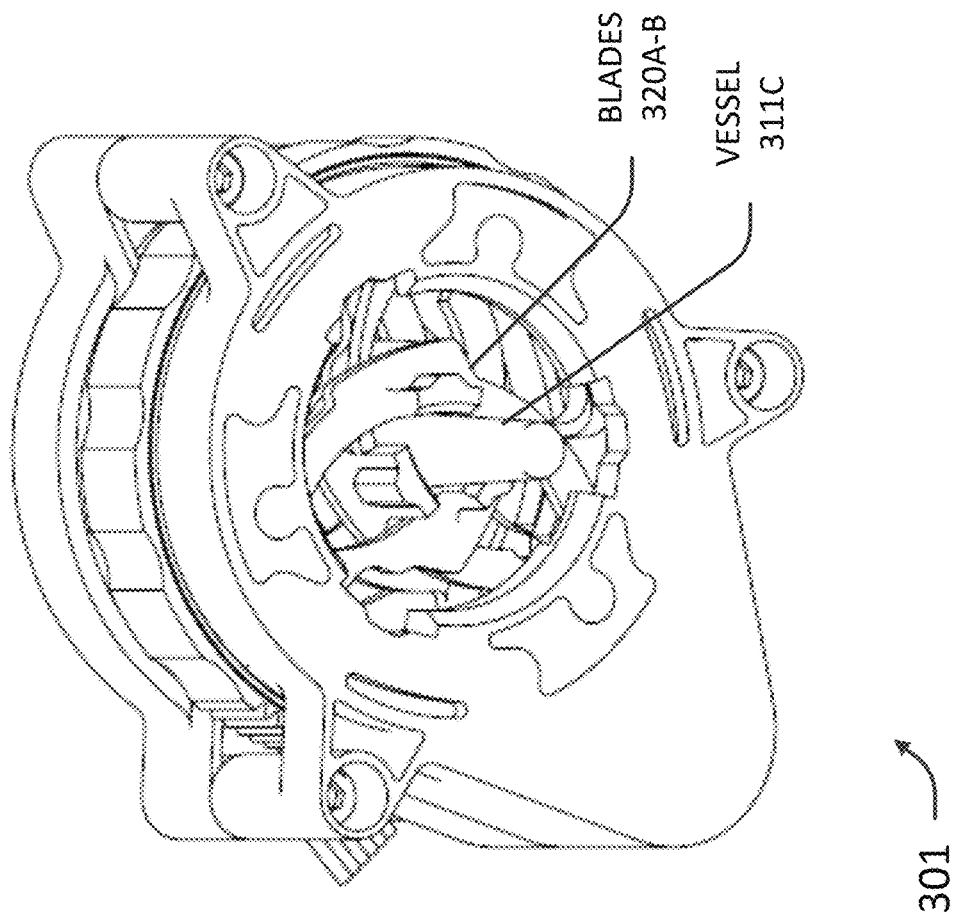
FIGS. 9A-C illustrate a gripper gripping a tapered vessel in one embodiment.
Figure 9A:
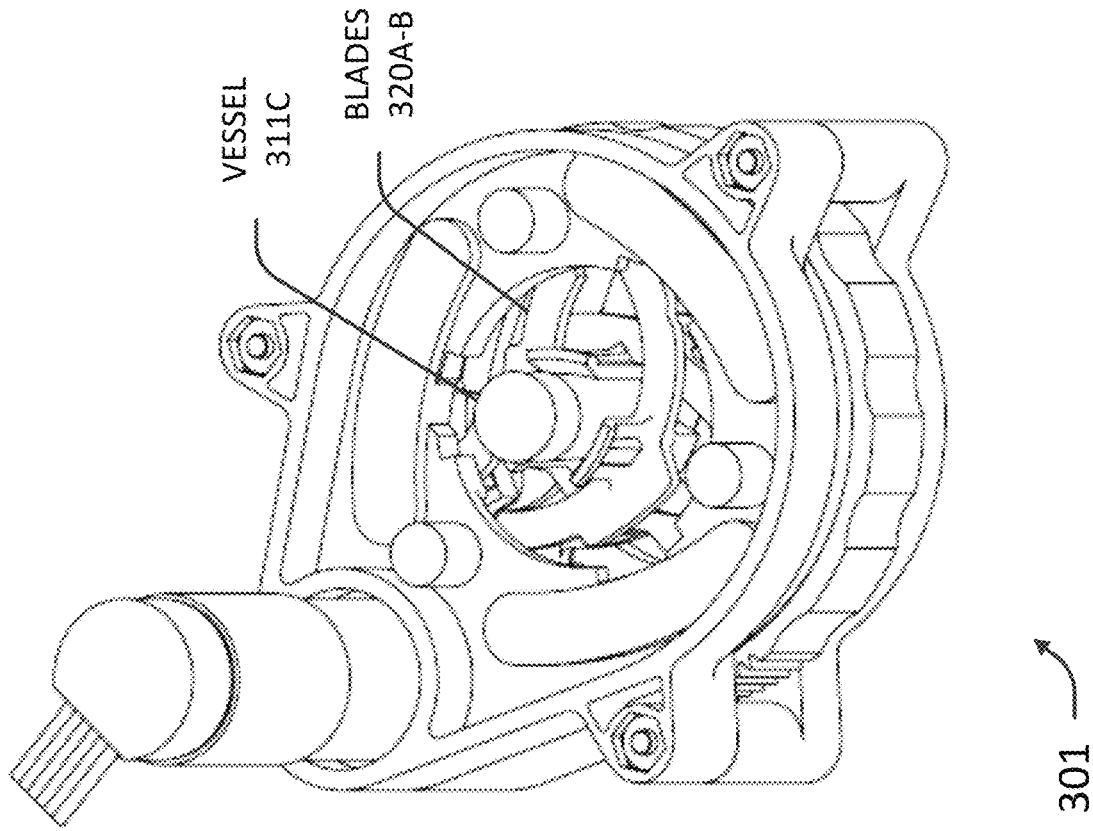
Figure 9C:
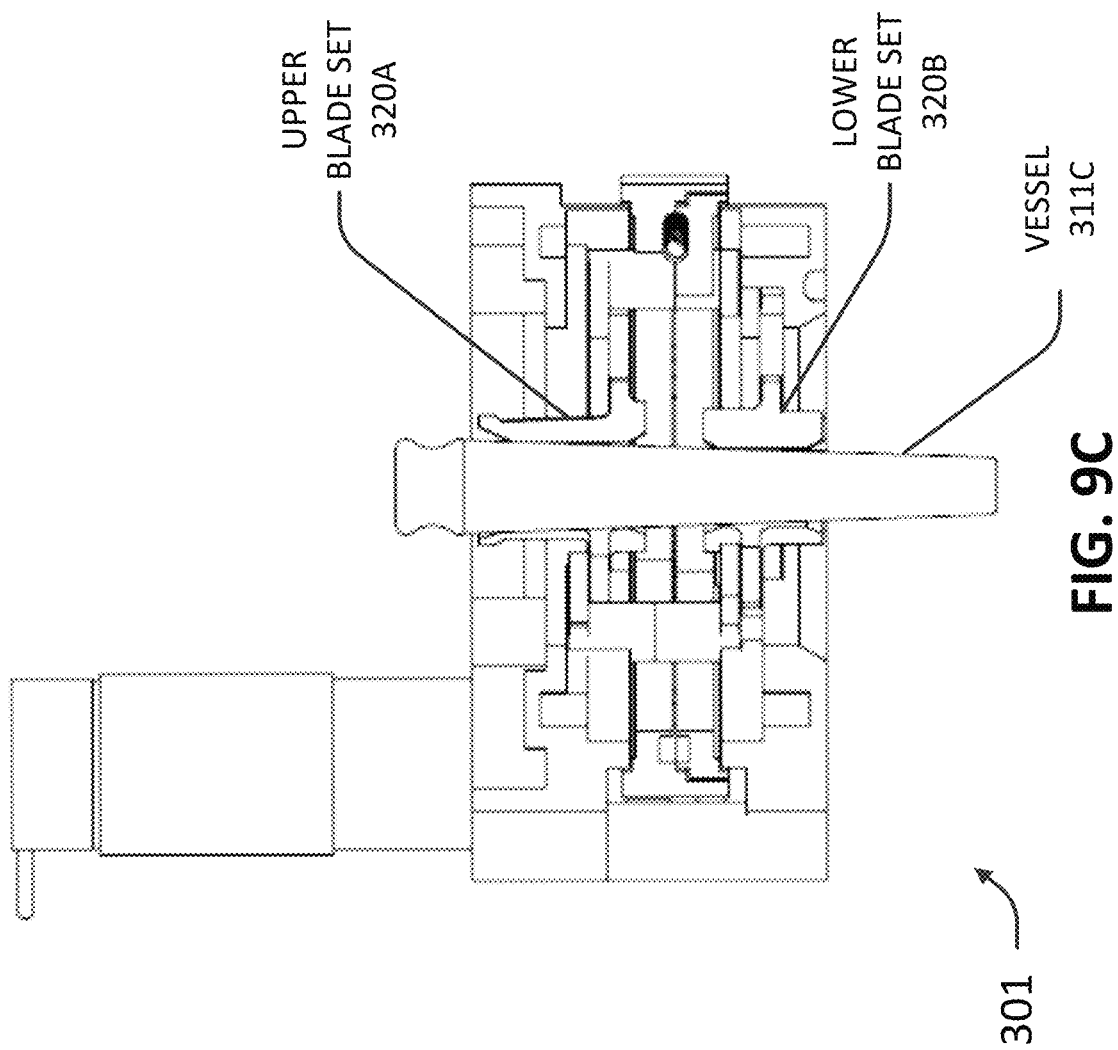

FIGS. 9A-C illustrate the gripper 301 gripping a tapered vessel 311C. FIGS. 9A-B show perspective views, while FIG. 9C shows a lateral cross-section view of the gripper 301. In contrast to the vessels 311A-B, the vessel 311C has a tapered shape, with different top and bottom diameters. As shown in FIG. 7C, to grip this vessel 311C, the upper blade set 320A may grip a top portion of the vessel 311C at a wider position, and the lower blade set 320B may grip a lower portion of the vessel 311C at a narrower position. To enable different positions between the upper blade set 320A and lower blade set 320B, the blades 320A-B may be unlinked (e.g., omitting connector pins 345 described above) and configured to open and close independently from one another. As a result, the blades 320A-B surround and securely grip the vessel 311C.

Figure 10C:
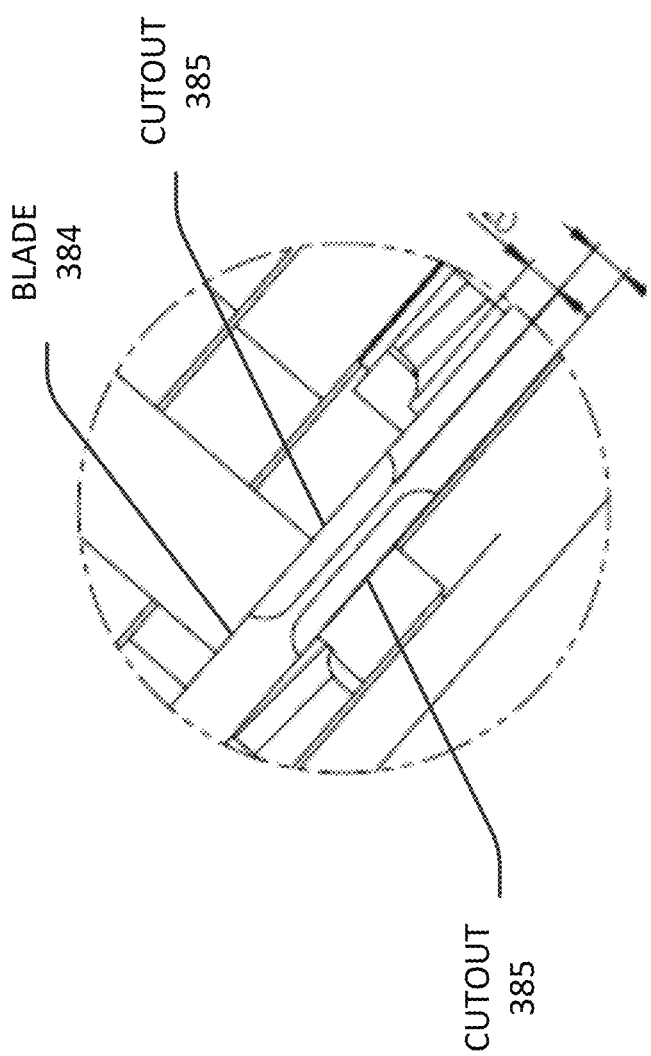

FIGS. 10A-C illustrate a gripper 303 in a further embodiment. The gripper 303 may incorporate one or more features of the gripper 301 described above. In particular, the gripper 303 may include a motor 386 mounted to a support structure 380, which encompasses a ring structure 388. A set of blades 384 resides within the support structure 380. The motor 386 may include a servo motor having sensors for detecting movement and velocity, and may drive rotation of the ring structure 388 relative to the support structure 380. Though this rotation, the ring structure 388 may move the blades 384 towards or away from a vertical center axis of the support structure 380. In doing so, the blades 384 may grip a vessel or other object that is placed within the support structure.

Some or all of the blades 384 may define cutouts 385 at a center portion of the blades 384. As shown in the lateral view of FIG. 10C, the cutouts 385 may occupy a top and/or bottom side of the blades 384 along a portion adapted to contact a vessel. The cutouts 385 may reduce the effective pitch of the blades 384 at the surface contacting the vessel, ensuring that the blades 384 make contact with a vessel at a surface centered between the cutouts 385. This configuration may assist in forming a secure grip of tapered vessels such as the vessel 311c described above.

Figure 11:
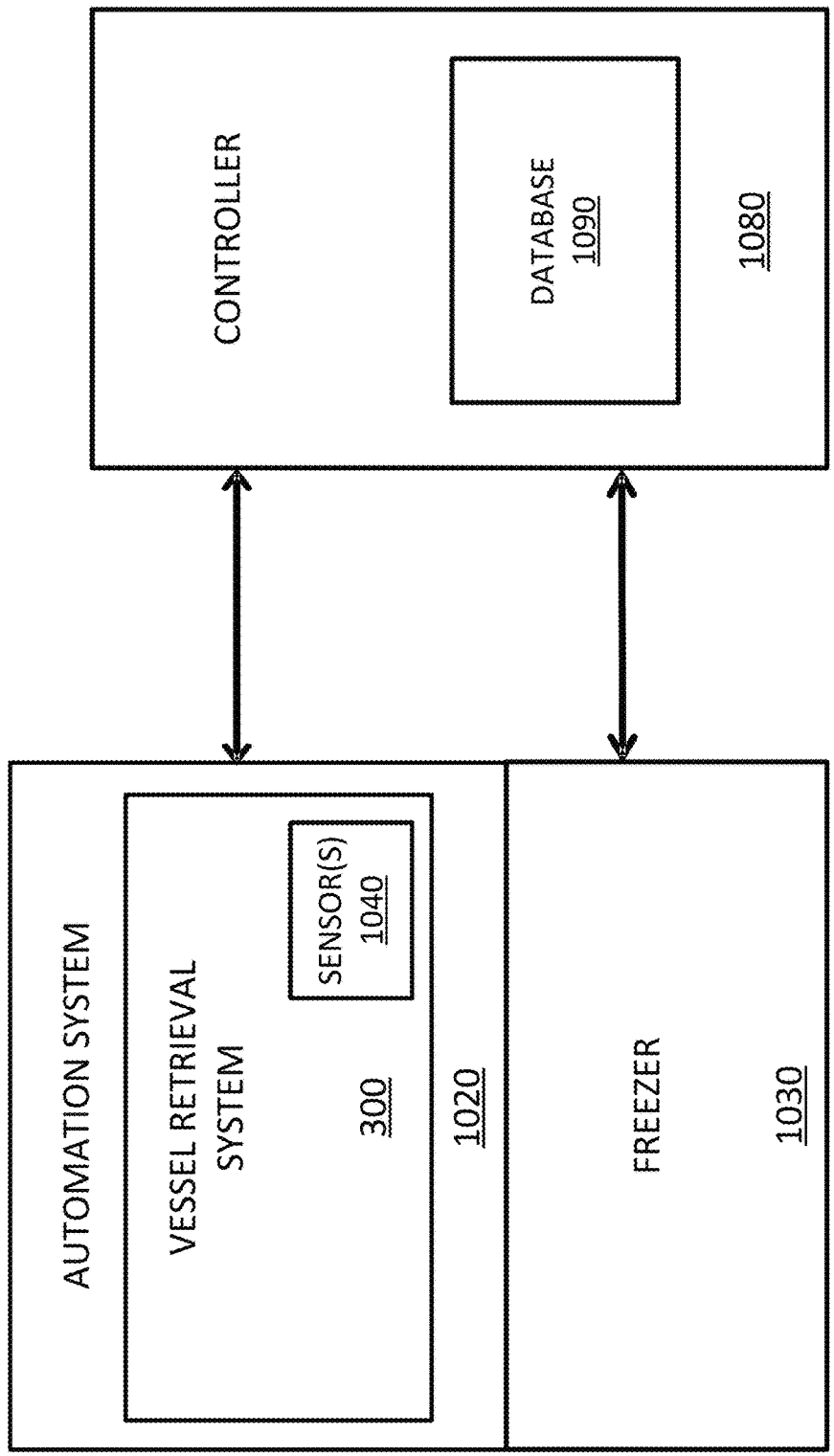
FIG. 11 is a block diagram of an automated storage system in which embodiments may be implemented.

FIG. 11 is a block diagram of an automated storage system 1000 in which the gripper 301, with the vessel retrieval system 300 or other automated system, may be implemented. The system 1000 may include an enclosure (e.g., freezer 1030) configured to hold a plurality of sample vessels in a controlled environment (e.g., below a threshold temperature for storing the sample vessels, such as a cryogenic temperature), as well as an automation system 1020 configured to handle the sample vessels, for example by retrieving vessels from the enclosure, returning vessels to the enclosure, and/or reconfiguring vessels within or between racks or other storage units. The automation system 1020 may include the vessel retrieval system 300 as described above, which in turn may include the gripper 301. The gripper 301, through a selection of component materials and placement as described above and/or other modifications, may be configured to operate in a variety of environments with regard to temperature and humidity. For example, the gripper 301 may be configured to operate at room temperature, or may be configured to operate within the freezer 1030 as it maintains an environment at or less than 0° C., at or less than −20° C., at or less than −80° C., or at or near cryogenic temperatures (between −150° C. and −273° C.).

A controller 1080 may be connectively coupled to the automation system 1020 and freezer 1030, and generally controls some or all of the operations of each. For example, the controller 1080 may monitor and regulate temperature, humidity, and other conditions within the freezer 1030. The controller 1080 may also control the automation system 1020 to manage and control the transfer of samples to and from the freezer 1030. The controller 1080 may also control other operations such as calibration of mechanical components, identifying samples, and failure or disaster recovery. Further, the controller may maintain a database 1090 storing information regarding the samples stored within the freezer 1030, including the location of each sample (i.e., rack and sample box) within the freezer 1030. The controller 1080 may update the database 1090 in response to the transfer of samples into or out of the freezer 1030.

The controller 1080 may also control operation of the vessel retrieval system 300, including the gripper 301. With reference to FIGS. 4A-C, the controller 1080 may direct movement of the gripper 301 including operation of the blades 320A-B. To control the blades 320A-B to ensure proper gripping of vessels without damaging the vessels, the controller 1080 may operate the blades 320A-B though ranges of motion and configure positions of the blades 320A-B based on feedback from the motor 340 and/or a user. For example, the controller 1080 may establish an open position based on the open-end travel of the blades 320A-B, monitoring the motor current as it stalls at the extreme of travel. To determine a proper closed position for the blades 320A-B when gripping a given vessel, a user may manually move the gripper jaws to the correct location, and the controller 1080 may establish this position based on a number of motor turns from the open position. A fully closed position may also be established in this manner. Thus, the proper configuration and/or positions of the blades 320A-B and/or motor 340 for gripping a given vessel may be determined by the controller 1080, and such configurations may be stored to the database 1090. For applications wherein a range of different vessel types are used, such as the vessels 311A-C described above, the configurations for each vessel type may be stored to the database 1090. Then, prior to gripping a given vessel, the controller may identify the vessel type (e.g., based on predetermined information on the vessel, or detecting the vessel type via a sensor or other means), retrieve the corresponding configuration from the database 1090, and control the griper to grip the vessel in accordance with the configuration.

The controller 1080 may implement a process to determine where it should find a vessel based on the aforementioned values, and may instruct the motor 340 to achieve the correct position when gripping a vessel. To securely grip a vessel, the controller 1080 may determine a grip location smaller than the vessel. The controller 1080 may also set a "window" to evaluate the final position of the motor 340. When the blades 320A-B close in on a vessel, the controller 1080 may anticipate a signal from the motor 340 indicating a stall somewhere in this position window. Providing this signal is received, the controller 1080 may determine that the vessel is securely gripped and the move is complete. In an alternative embodiment, the vessel retrieval system 300 may implement one or more sensors 1040 (e.g., feedback from the motor 340, distance sensors, cameras) to determine the position of a vessel and the blades 320A-B, and the controller 1080 may implement the output of those sensors 1040 to control the gripper 301 without a predetermined configuration for the vessel.

To provide the control operations described above, the controller 1080 may include suitable computer hardware and software resources, such as one or more computer workstations and an interface configured for communication with the automation system 1020 and freezer 1030. Components of the controller 1080 may be implemented at the automation system 1020, including the vessel retrieval system 300, as well as remote from the automation system 1020. The controller 1080 may also include an interface (e.g., a workstation) allowing a user to monitor the system 1000 as well as monitor and initiate the aforementioned operations of the system 1000.

While example embodiments have been particularly shown and described, it will be understood by those skilled in the art that various changes in form and details may be made therein without departing from the scope of the embodiments encompassed by the appended claims.

What is claimed is:

1. An apparatus for gripping a vessel, comprising:
   a support structure having a center axis;
   a motor; and
   a gripper stage including:
   a plurality of blades, each of the plurality of blades having a) a first end through which a blade rotation axis extends, the blade rotation axis being fixed relative to the support structure and offset from the center axis, b) a second end that is circumferentially and radially moveable to rotate the blade about the blade rotation axis, and c) a center portion located between the first end and the second end; and
   a ring structure coupled to the motor to rotate the ring structure around the center axis, the ring structure, as it rotates, moving the second end of each blade around the center axis to rotate the blade about the blade rotation axis of the blade to shift the center portion towards the center axis to contact an outer portion of a vessel extending along the center axis.

2. The apparatus of claim 1, wherein the gripper stage is a first gripper stage, and further comprising a second gripper stage including:
   a plurality of blades, each of the plurality of blades having a) a first end through which the blade rotation axis extends, b) a second end that is moveable by the ring structure to rotate the blade about the blade rotation axis, and c) a center portion.

3. The apparatus of claim 2, wherein the ring structure includes a common ring configured to move the plurality of blades of the first and second gripper stages.

4. The apparatus of claim 1, wherein the gripper stage further includes a plurality of rotational pins, each of the plurality of rotational pins being coupled along a respective blade rotation axis to the support structure and to the first end of the respective blade, the blade rotating about the rotational pin.

5. The apparatus of claim 1, wherein the second end of each of the plurality of blades is connected to a respective drive pin, the respective drive pin being engaged by the ring structure to move the second end of the blade to rotate the blade about the blade rotation axis.

6. The apparatus of claim 5, wherein each drive pin is positioned to slide within a radial slot within the ring structure as the ring structure rotates.

7. The apparatus of claim 5, wherein an opposed end of each drive pin is positioned to move within a curved slot of the support structure as the ring structure rotates.

8. The apparatus of claim 7, wherein each drive pin is positioned to slide within a radial slot within the ring structure as the ring structure rotates.

9. The apparatus of claim 1, wherein the plurality of blades are three blades.

10. The apparatus of claim 1, wherein each of the plurality of blades is curved away from the center axis.

11. The apparatus of claim 1, wherein a) in a first position prior to rotation of the ring structure, the plurality of blades conform to an inner edge of the ring structure, and b) in a second position following rotation of the ring structure, the center portion of each of the plurality of blades contacts an outer edge of the vessel.

12. The apparatus of claim 1, wherein the center portion of each of the plurality of blades includes a pad positioned to contact the vessel.

13. The apparatus of claim 1, wherein the plurality of blades are adapted to grip vessels having different diameters.

14. The apparatus of claim 1, further comprising a controller, the controller being configured to actuate the motor to control the rotation of the ring structure.

15. The apparatus of claim 14, wherein the controller is further configured to rotate the ring structure a distance based on the diameter of the tube, the distance corresponding to the plurality of blades being in contact with the tube.

16. The apparatus of claim 14, further comprising a sensor configured to detect at least one of position and size of the tube, the controller being configured to rotate the ring structure a distance based on an output of the sensor.

17. The apparatus of claim 16, wherein the sensor includes a force feedback sensor at the motor.

18. The apparatus of claim 1, further comprising a picker robot coupled to the support structure, the picker robot configured to translate the support structure between a storage location at which the vessel resides and a destination to which the vessel is to be transported.

19. The apparatus of claim 18, further comprising a loading device configured to 1) position a loading pin beneath the vessel at the storage location and 2) drive the loading pin upward to raise the vessel towards the plurality of blades.

20. A vessel retrieval system, comprising:
   a gripper configured to grip a vessel, the gripper including:
   a support structure having a center axis;
   a motor; and
   a gripper stage including:
   a plurality of blades, each of the plurality of blades having a) a first end through which a blade rotation axis extends, the blade rotation axis being fixed relative to the support structure and offset from the center axis, b) a second end that is circumferentially and radially moveable to rotate the blade about the blade rotation axis, and c) a center portion located between the first end and the second end; and
   a ring structure coupled to the motor to rotate the ring structure around the center axis, the ring structure, as it rotates, moving the second end of each blade around the center axis to rotate the blade about the blade rotation axis of the blade to shift the center portion towards the center axis to contact an outer portion of the vessel extending along the center axis;
   a picker robot configured to translate the gripper between a storage location at which the vessel resides and a destination to which the vessel is to be transported; and a loading device configured to 1) position a loading pin beneath the vessel at the storage location and 2) drive the loading pin upward to raise the vessel towards the plurality of blades.

21. The vessel retrieval system of claim 20 wherein an ambient temperature of the storage location is at or below 0° C.

* * * * *